US006616720B1

(12) United States Patent
Smith

(10) Patent No.: US 6,616,720 B1
(45) Date of Patent: Sep. 9, 2003

(54) PORTABLE AIRBORNE CONTAMINATION CONTROL SYSTEM INCLUDING A MAIN AND REMOTE UNIT

(76) Inventor: William C. Smith, 10630 Riggs Hill Rd., Suite S, Jessup, MD (US) 20794

( * ) Notice: Subject to any disclaimer, the term of this patent is extended or adjusted under 35 U.S.C. 154(b) by 0 days.

(21) Appl. No.: 10/102,809

(22) Filed: Mar. 22, 2002

Related U.S. Application Data

(63) Continuation-in-part of application No. 09/784,127, filed on Feb. 16, 2001, now Pat. No. 6,395,047.

(51) Int. Cl.[7] .......................... B01D 29/50; B01D 50/00

(52) U.S. Cl. ....................... 55/385.2; 55/385.1; 55/356; 55/DIG. 18; 55/DIG. 46; 454/187

(58) Field of Search ............................ 55/385.1, 385.2, 55/356, 471, DIG. 18, DIG. 46; 454/187

(56) References Cited

U.S. PATENT DOCUMENTS

| | | | | | |
|---|---|---|---|---|---|
| 2,730,033 | A | * | 1/1956 | Mellor | 55/DIG. 46 |
| 3,173,879 | A | * | 3/1965 | Arnold et al. | 55/DIG. 46 |
| 3,181,541 | A | * | 5/1965 | Brooking | 55/DIG. 46 |
| 4,163,650 | A | | 8/1979 | Watson et al. | |
| 4,321,064 | A | * | 3/1982 | Vargo | 55/DIG. 46 |
| 4,512,245 | A | | 4/1985 | Goldman | |
| 5,281,246 | A | | 1/1994 | Ray et al. | |
| 5,462,569 | A | * | 10/1995 | Benjamin | 55/385.6 |
| 5,558,112 | A | * | 9/1996 | Strieter | 55/385.2 |
| 5,593,470 | A | * | 1/1997 | Shagott et al. | 55/356 |
| 5,785,723 | A | | 7/1998 | Beran | |
| 5,849,053 | A | * | 12/1998 | Napadow et al. | 55/DIG. 46 |
| 5,853,441 | A | | 12/1998 | Groen | |
| 5,873,919 | A | * | 2/1999 | Vross et al. | 55/356 |
| 5,942,017 | A | * | 8/1999 | Van Winkle, Sr. | 55/385.1 |
| 5,976,225 | A | * | 11/1999 | Nystrom et al. | 55/DIG. 46 |
| 6,143,048 | A | | 11/2000 | Comproni | |
| 6,162,270 | A | * | 12/2000 | Nystrom et al. | 55/DIG. 46 |
| 6,395,047 | B1 | * | 5/2002 | Smith | 55/DIG. 46 |

* cited by examiner

*Primary Examiner*—Duane Smith
*Assistant Examiner*—Minh-Chau T. Pham
(74) *Attorney, Agent, or Firm*—Tom Hamill, Jr.

(57) ABSTRACT

The invention is an airborne contamination control system with a main device unit and a remote unit. The main airborne contamination control unit is a cabinet including a motor in communication with an air treatment path. The main unit has a variety of configurations. The main unit has the capability to be connected to any of a plurality of lightweight remote units, depending on the specific application. These remote units are highly portable and of a small dimension which permits them to be employed in areas inaccessible to the main unit. The main unit is connected to the remote unit by an elongated and flexible duct. Both the main unit and remote unit have a general cabinet structure with mounting structure designed to receive dual or single articulated suction ducts thereon. The articulated suction ducts may be placed proximal a work piece which is being coated, abraded or treated by spraying. The articulated suction ducts collect overspray and errant particles and transports them to and through a filter located in the main unit. The filtered air is then exhausted through an exhaust port on the main unit. An elongated duct may be connected to the exhaust port to transport the air to a distant location. The invention permits the main unit to be employed independently on easily accessible locations as well as in conjunction with the remote unit in difficult to reach locations. The remote unit may further be adapted to other configurations which would increase its utility.

12 Claims, 12 Drawing Sheets

PORTABLE AIRBORNE CONTAMINATION CONTROL SYSTEM INCLUDING A MAIN AND REMOTE UNIT

This application is a Continuation-in-Part of application Ser. No. 09/784,127 filed on Feb. 16, 2001 now U.S. Pat. No. 6,395,047 B1.

BACKGROUND OF THE INVENTION

1. Field of the Invention

The present invention relates generally to overspray, errant particle and other airborne contaminant control systems and devices. More particularly the invention is directed to such a system having a main unit and a remote unit, where the remote unit is connected by an elongated duct to the main unit. Generally, the main unit creates a vacuum which is brought into communication with the remote unit by the elongated duct. The remote unit brings a negative pressure differential into the enclosed area removing the aforementioned overspray. The system's main unit and remote unit may be adapted to multiple configurations to permit them in concert to work in small inaccessible areas. The main unit may still be employed singly in areas to which it is accessible.

2. Summary of the Invention

Equipment developed to capture and filter contaminants generated in the workplace such as welding fumes, sanding and grinding residue, spraying liquids, such as paint which produce odors, toxic fumes, and volatile organic compounds is well known. The majority of this equipment consists of an enclosure, the enclosure housing a motor, blower and a cone, generating the suction necessary to pull the contaminants through a filtering system, often a series of filters, each filter having a specific function. These enclosures are generally fixed.

Capturing liquid contaminants stands separate from fumes or dust contaminants because they must control toxic fumes, volatile organic compounds (VOCs), objectionable odors and wet particles that adhere to the skin, clothing and other equipment in the workplace. For this reason, the area for containment is a booth that will accommodate a car, truck, plane or equipment which prevents aforesaid contaminants into the surrounding environment.

There is a requirement for a system which is portable, flexible, and treats a wide variety of applications and is unenclosed without presenting harm or danger to the workers or environment. The requirements for this equipment must include an approved method for capturing solid, liquid or gaseous elements including explosive elements. The use of the portable, unenclosed device of the instant invention is desired to be employed in the production, repair, replacement, overhaul, or revamping of devices such as equipment, cars, trucks, aircraft, military hardware, civilian hardware, ships, bridges and the like. The device must also have the capability to be used where welding, sanding and painting (coating) on a smaller scale is being performed, such as small on-the-spot jobs. The capability to evacuate odors and fumes away from the workpiece, no matter where that workpiece is located, is required.

Spraying of coatings, abrasives, and other atomizable substances is a highly efficient way to deliver such substances to a surface or workpiece. A problem encountered is the overspray or errant particles generated by the spraying. This causes environmental issues by placing possibly harmful material into the air. It further endangers the workers spraying the substances, who may breathe the overspray which may be harmful.

The system and devices of the invention may be employed in conjunction with spraying or coating systems which may be employed for touch-up work or small repair jobs. These jobs may be deep in the interior of a ship, aircraft or vehicle. Often it is difficult to gain access to such locations on the aforementioned work areas in order to treat, coat or paint the work pieces located there. Once access is achieved there is often no viable way to evacuate the overspray, errant particles, fumes and the like from such enclosed areas as inside an aircraft, ship or other large vehicle (bus, train, etc.). This is because the conventional overspray evacuation equipment is heavy and bulky and cannot be transported proximal such a location being sprayed. By use of the instant invention, one may afford all the benefits of an airborne pollution control device in such an inaccessible or remote location.

The invention is a portable airborne contamination control system with a main unit cabinet and a remote unit. The invention is capable of capturing solid, liquid, and gaseous elements in a single cabinetry which may be adjustable to a variety of applications including the connection to a remote unit. The main unit can stand alone and operate in a conventional mode, such as in collection of overspray from the coating or spraying of an exterior of a large aircraft for example. The main airborne contamination control unit is a cabinet including a motor in communication with an air treatment path. The motor generates a vacuum or negative pressure which communicates through the adjustable ducts, filters, treatment systems and even may be employed to exhaust undesirable air which has been entrained with the errant particles, VOCs, overspray and the like. The main unit has a variety of configurations enhancing its flexibility.

The main unit has the capacity to be connected to a lightweight remote unit. The elongated and flexible duct connecting the main unit to the remote unit may be 50 feet or longer as required, its length could be extended by using a higher horsepower motor. The term duct is intended to include devices of a similar nature such as hoses, flexible pipes, and the like. The remote unit is highly portable and of a small dimension which permits it to be employed in areas inaccessible to the main unit. The remote unit weighs and is dimensioned significantly less than the main unit which affords it greater mobility and permits the remote unit access and be used in remote locations where the main unit could not fit or be placed due to its weight. It is believed that the remote unit will weigh less than 100 pounds. The main unit is connected to the remote unit by an elongated and flexible duct. Both the main unit and remote unit have a general cabinet structure with mounting structure designed to receive dual or single articulated suction ducts thereon. The articulated suction duct(s) may be placed proximal a workpiece which is being coated, abraded or treated by spraying. The articulated suction duct(s) collect overspray, errant particles, odors and fumes and transports them to and through a filter located in the main unit. The filtered air is then exhausted through an exhaust port on the main unit. A second elongated duct, tube, pipe or the like may be connected to the exhaust port to transport the air to a distant location. The invention permits the main unit to be employed independently with easily accessible locations as well as in cooperation with the remote unit in order to enjoy the benefits in difficult to reach locations.

When using the main unit, one may place the articulated suction duct(s) precisely at the location where the contamination is being generated. When the main unit is connected to the remote unit, one may place the remote unit with single or dual articulated suction ducts attached thereto precisely at the location where the contamination is being generated.

The portable airborne contamination control device with a remote unit basically has two parts. The main unit includes a wheeled cabinet-type housing including a motor-blower, cone, filter, control panels, multiple intake and exhaust ports. The remote unit has a general cabinet-like configuration which may include multiple intake mounts, single intake mounts and an exhaust port to which the elongated duct is designed to be mounted. It may be wheeled or affixed to a mobile vehicle. It may be placed on a portable lifting device, such as scissor lift, to permit the main unit to be moved up and down while men or machines are treating the workpiece. The remote unit is in communication with the main unit's housing by an elongated duct.

The main unit includes a housing having a top side wall, a bottom side wall, a right side wall, a left side wall, a front side wall and a back side wall. The walls define a generally rectangular cabinet with an interior and an exterior.

The interior of the cabinet of the main unit is separated into a plurality of subassemblies. The first subassembly includes a motor-blower. The motor-blower may be chosen to be any of a variety of sizes (horsepower). In the preferred embodiments of the invention, the motor-blowers may be 1, 1.5, 3 & 5 horsepower. Versions of the invention with motors of greater or lesser horsepower have been contemplated. The instant device shown herein is a 5 horsepower explosion-proof motor-blower. Additionally, a motor cage unit is provided which allows precise alignment of the blower with an inlet cone. This maximizes suction efficiency. Further, it permits an interchangeability of motor and blower sizes to meet different suction needs. When using the remote unit, the energy of the motor is essentially transferred from main unit through the elongated and flexible duct to the articulatable suction duct(s) connected to the remote unit. There may be energy losses due to the length of the elongated duct connecting the main unit to the remote unit, however, these may be overcome by choosing a strong enough motor-blower.

The second subassembly may be considered to be a filter housing. The filter housing may contain any of a variety of filters depending on the application the device is being specifically employed for. The motor-blower is in communication with the filter housing. A false bottom is provided proximal the bottom wall. The false bottom permits a power conduit to run from the lower portion of the right side wall to the control panel and then from the control panel to the motor-blower. The false bottom adds structural integrity which would permit the unit to be picked up and moved by a fork-lift, crane, elevator or other lifting device.

The left side wall includes an opening through which a portion of the motor-blower protrudes. The left side wall further includes an opening to permit electrical power for the motor-blower. The left side wall is removably attached to the housing. When the left side wall is removed, the motor-blower may be removed by sliding the motor-blower and its support assembly from the subhousing in which it resides for maintenance. The left side wall further includes a handle mounted on the exterior for pushing the unit. The handle doubles as a storage device for the power cord. The handle extends from the housing a sufficient length to protect the portion of the motor-blower which extends from the exterior of the housing from damage.

The right side wall includes a control panel. A switch may be used on the control panel to turn the motor on or off. The control panel further shows the general condition of the filters, including the life remaining. An overload control is also provided. Other control systems may be located here. The right side wall further includes a handle mounted on the exterior for pushing the unit. The handle extends from the housing a sufficient length to protect the control panel from damage.

The bottom side wall includes a plurality of wheels mounted thereto which permits the unit to be easily rolled. The wheels bring the unit off the ground about 5 inches. This would permit the times of a fork-lift to easily fit underneath the unit. The wheels may be locked in place, securing the unit to a specific location.

The back side wall is a solid and integral wall member.

The front side wall includes a door and an exhaust port. The door is located on the right side of the front side wall. The door includes a seal. The door may be opened by actuating a handle. Once opened, access to the filter assembly and the plenum is secured. The exhaust port includes means to mount an exhaust hose thereto. The exhaust hose may be brought to the outside so that any toxic fumes picked up be the main unit or the remote unit would be transported away. This exhaust path may safely take the toxic gases, particulates, etcetera to an area acceptable to their disposal and treatment.

The top side wall includes a downdraft access door. The downdraft access door gives access to a chamber which resides beneath the door. Next to the downdraft access door is a first panel.

The first panel may have two or more different configurations. In a first configuration the first panel includes a pair of duct-mounting apertures. The duct-mounting apertures are designed to mate with the articulated suction ducts. The articulated suction ducts include means to permit them to articulate and remain in the position that they are placed. This is the configuration which permits the main unit to operate independently.

In the second configuration the first panel includes a central duct mounting aperture. An elongated central duct is provided. The effective length of the central duct varies with the motor-blower. In the case of the 5 horsepower explosion-proof motor-blower, the elongated central duct has a 10 inch diameter and may be as 20 long as 50 feet. The dimensions of the elongated central duct varies with the horsepower of the motor-blower. The elongated central duct has a first end and a second end. The first end is connected to the central duct-mounting aperture by any conventional means. The second end would be connected to the remote unit. This permits the air pollution control unit to operate in generally inaccessible areas.

The first and second configurations may be changed simply by removing and/or changing panels with the appropriate configuration. This may be done easily without special tools. By removal of both configurations, an area for spraying right on the downdraft portion of the main cabinet is provided.

The main unit may also be considered to be comprised of other equivalent systems and devices, there are many such air suction devices which may be adapted to use the remote unit of the instant invention.

A remote unit is provided. The remote unit is small in weight and in dimension to the main unit. The remote unit includes a top side wall, a bottom side wall, a right side wall, a left side wall, a front side wall and a back side wall. The walls define a generally rectangular cabinet. The right side wall includes a central duct-mounting aperture. The remote unit central duct-mounting aperture is designed to receive the second end of the elongated central duct. The top side wall of the remote unit may include a single duct-mounting aperture or a pair of duct-mounting apertures. In the single duct-mounting aperture embodiment the aperture is generally located in the center of the remote unit top side wall. In the pair of duct mounting aperture embodiment the two apertures would be located side by side on the remote unit top side wall. The duct-mounting aperture(s), either single or double, are designed to mate with one or two articulated suction ducts depending on the embodiment employed. The articulated suction duct includes means to permit it to articulate and remain in the position that it is placed by the user. It is to be understood that the articulated suction duct or ducts are remote (distant) from the main unit in this configuration. The remote unit may be wheeled for ease of movement.

There are other possible configurations for the remote unit. For instance, in one case, the top side wall may be comprised of a pivotally mounted door. When the door is opened, a screen support or the like may be located therein. The screen support is similar to the screen shown by element A in FIG. 9A. A small workpiece may be placed on the screen support and sprayed or coated and the overspray, errant particles, VOCs and the like would be caused to travel through the remote unit and in to the elongated duct which is connected to the main unit. The vacuum imparts energy to move the particles to the treatment area of the main unit, and then the air would be subsequently exhausted in a safe manner.

Another possible configuration for the remote unit is where one of the sidewalls would be removed and a porous surface or prefilter would be substituted. In this embodiment the porous surface or prefilter would be preferably located on the sidewall opposite the central duct mounting aperture to which the elongated duct is affixed. This configuration may be employed where a general evacuation of airborne contaminants of the types mentioned throughout this patent is desired.

The invention in all of its variants and embodiments is designed to permit the coating, spray painting, or touch-up work to be performed in areas which would be inaccessible to the main unit. The main unit has an approximate weight of 600 lbs. The remote unit may weigh as much as 70 lbs. The remote unit is of a much smaller dimension than the main unit described herein. The remote unit may have integral wheels or be supported by a cart. It is to be understood that the remote unit may easily be employed with other equipment in this arena of technology. One merely needs to adapt the width of the elongated duct or hose to fit the intake of any air intake device available or conceivable.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be thought of as limiting.

As such, those skilled in the art will appreciate that the conception, upon which this disclosure is based, may readily be utilized as a basis for designing other structures, methods, and systems for carrying out any of the purposes of the present invention. It is important, therefore, that the claims be regarded as including such equivalent constructions insofar as they do not depart from the spirit and scope of the present invention.

It is therefore an object of the present invention to provide a portable airborne contamination control system with an independently employable main unit with the capability to be connected with a remote unit.

It is a further object of the present invention to provide a portable airborne contamination control system which may be employed in accessible and inaccessible areas.

It is another object of the present invention to provide a portable airborne contamination control system wherein the main unit has a top portion which has a plurality of configurations, including a first configuration which permits two articulatable suction ducts to be affixed thereto.

It is another object of the present invention to provide a portable airborne contamination control system wherein the main unit has a top portion which has a plurality of configurations, including a second configuration which permits a single elongated duct to be affixed thereto, the elongated duct to be connected to a remote unit.

It is another object of the present invention to provide a portable airborne contamination control system wherein the remote unit has a top portion which has a pair of apertures which permits two articulatable suction ducts to be affixed thereto.

It is another object of the present invention to provide a portable airborne contamination control system wherein the remote unit has a top portion which has a single apertures which permits an articulatable suction duct to be affixed thereto.

It is another object of the present invention to provide a portable airborne contamination control system wherein the remote unit has a top portion which includes a pivotally mounted door, which may be opened to reveal a porous support structure or downdraft structure underneath, which permits a workpiece to be placed and treated thereon.

It is another object of the present invention to provide a portable airborne contamination control system wherein the remote unit has a sidewall which is porous or includes a prefilter to evacuate contaminated air from an enclosed space which the main unit cannot access.

It is another object of the present invention to provide a portable airborne contamination control system wherein the remote unit has a side wall which has an aperture to receive the elongated duct from the main unit.

It is another object of the present invention to provide a portable airborne contamination control system wherein the main unit has a top portion which has a plurality of configurations, including a configuration which employs a downdraft area which permits small items to be treated (sprayed, welded, coated etcetera.) directly on the main unit.

These, together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a portable airborne pollution control system with a main unit and a remote unit embodying the principles and concepts of the present invention will be described.

Figure 1:
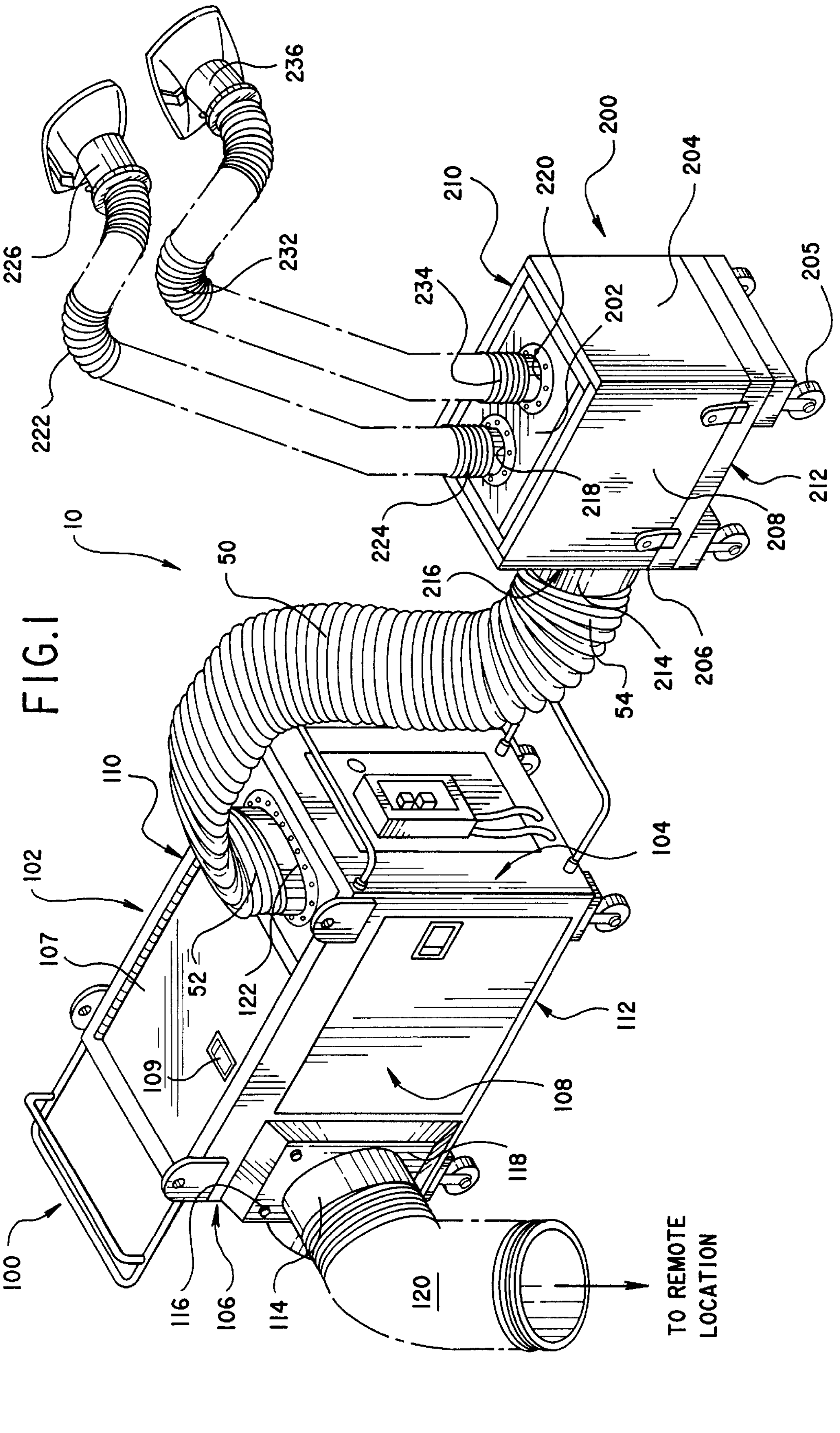
FIG. 1 is a view of the airborne pollution control system showing the main unit connected to the remote unit.

Turning initially to FIG. 1, the portable airborne pollution control system 10 is shown. The portable airborne pollution control system 10 includes a main unit 100 and a remote unit 200. The main unit 100 has a general cabinet like structure, including a top side wall 102, a right side wall 104, a left side wall 106, a front side wall 108, a rear side wall 110 and a bottom side wall 112. The bottom side wall 112 includes wheels 105, which permits the main unit 100 to be rolled. Braking means are provided to secure the wheels 105 from rotation. This permits the main unit 100 to be rolled to a desired location and then secured in that location by engaging the braking means. The braking means are conventional and may be easily engaged. Other structure for lifting, pushing and transporting the main unit 100 is present and will be discussed below.

Figure 13:
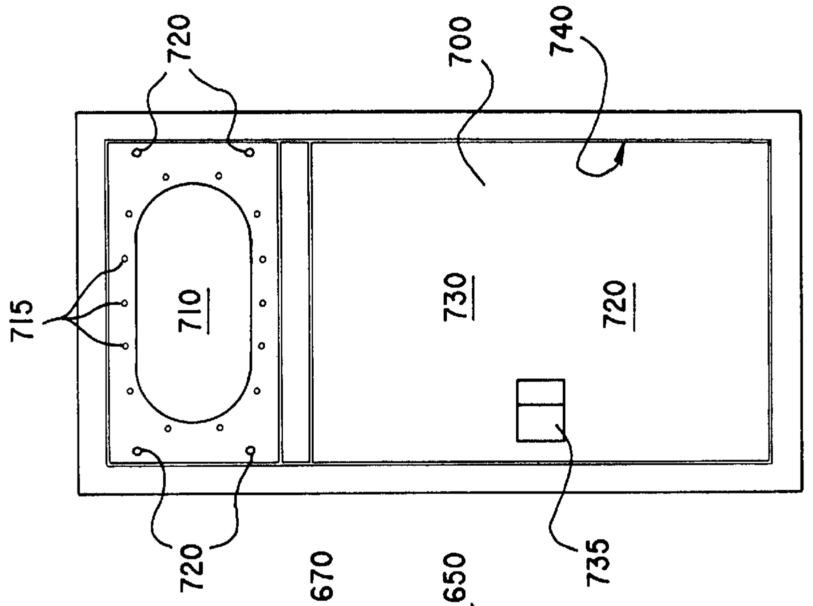
FIG. 13 is a top view of the main unit in a third configuration.

The top side wall 102 has a frame like substructure which permits its configuration to be easily altered. Top side wall 102 includes a downdraft door 107 with a downdraft door handle 109. When the downdraft door handle 109 is engaged, the downdraft door 107 may be opened and placed in a vertical relation to the top side wall 102. FIGS. 11–16 show the preferred configurations and will be discussed below. FIG. 1 shows the main unit 100 with a top side wall 102 showing the configuration as shown in FIG. 13.

The interior of the main unit 100 includes a motor-blower, a filter system and an air passageway. The air passageway includes an air intake port 122 and an air exhaust port 114. The motor-blower causes untreated air to enter the main unit 100 through the air intake port 122, pass through the filter system where the untreated air is treated, and then exhausts the treated air through an exhaust port 114 located on the front side wall 108.

The air intake port 122 is connected to the first end 52 of the elongated duct 50. Means to mount the first end 52 of the elongated duct 50 to the air intake port 122 are provided. The mounting means provided here may be one of any conventional and well-known mounting, connection and securing means.

The air exhaust port 114 includes mounting means 116 to secure a mask 118 and exhaust duct 120. The mask 118 completely covers the exhaust port 114 and is configured in a generally tapered fashion to mate to the exhaust duct 120 within specific tolerances. This permits any toxic fumes etcetera which may not be able to be treated by the organic filter system to be transported to a remote location. The remote location may include means to further treat and dispose of the exhaust. Since it is taken to a location away from the workers, worker safety is enhanced.

The top side wall 102 has an air intake port 122. The air intake port 122 is configured as an aperture. The air intake port 122 includes mounting means to secure a first end 52 of an elongated duct thereto.

In FIG. 1, the main unit 100 is shown connected to the remote unit 200 by an elongated duct 50. The elongated duct 50 has a first end 52 and a second end 54. FIG. 1 exemplifies the portable airborne pollution control system 10 with the main unit 100 being in communication with the remote unit 200 through an air passageway formed by elongated duct 50. The remote unit will be discussed in length during the discussion of FIGS. 3 & 3*a*.

Figure 2:
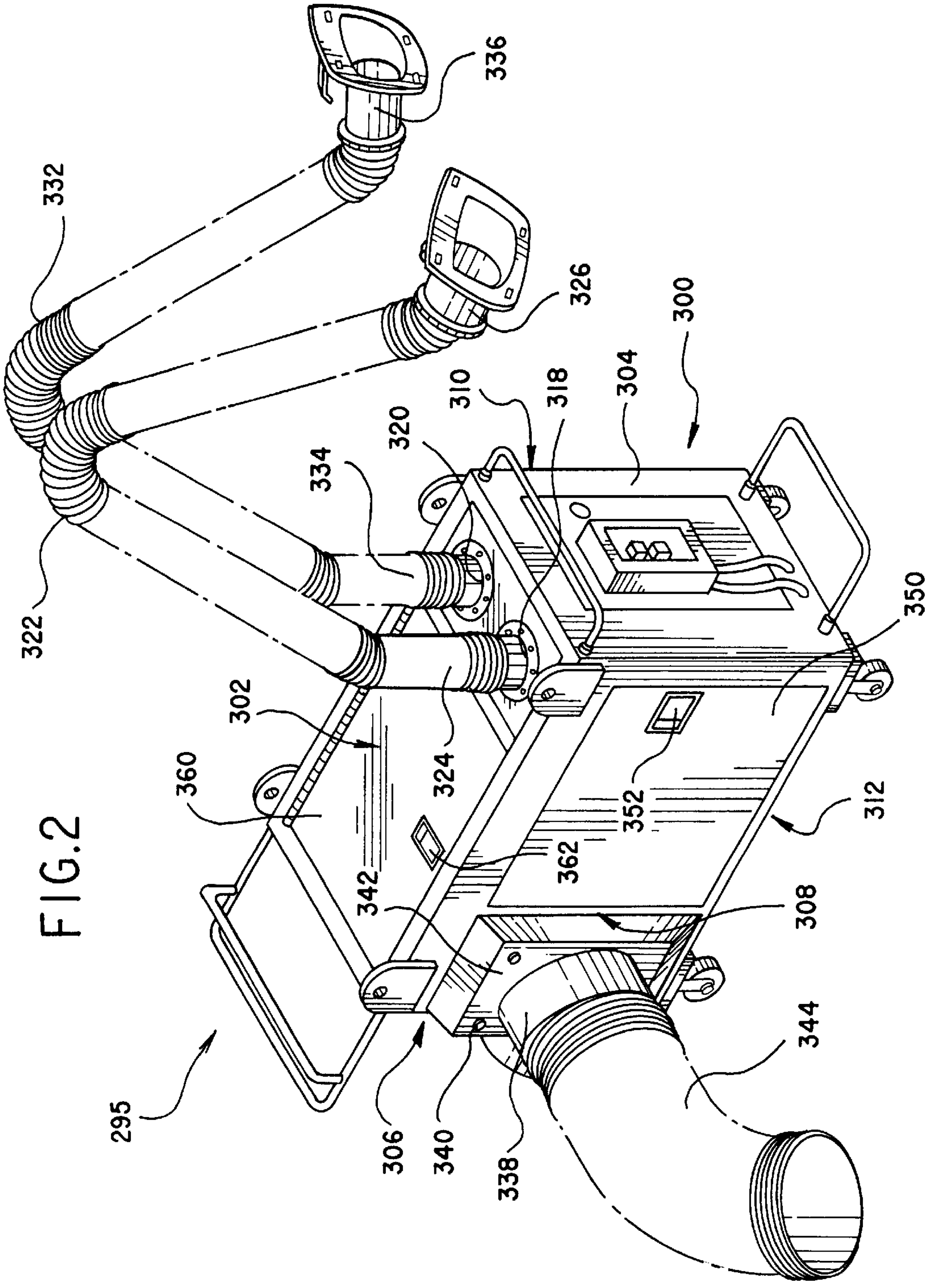
FIG. 2 is a view of the airborne pollution control system showing the main unit in one of a plurality of stand-alone configurations.

FIG. 2 shows the portable airborne pollution control system 295 in a second configuration. In the second configuration, the portable air pollution control system 295 just includes the main unit 300 in a stand-alone role. The main unit 300 again has a general cabinet-like structure, including a top side wall 302, a right side wall 304, a left side wall 306, a front side wall 308, a rear side wall 310 and a bottom side wall 312.

The bottom side wall 312 includes wheels 305, which permits the main unit 300 to be rolled. Braking means are provided to secure the wheels 305 from rotation. This permits the main unit 300 to be rolled to a desired location and then secured in that location by engaging the braking means. The braking means are conventional and may be easily engaged. Other structure for lifting, pushing and transporting the main unit 300 is present, such as reinforcement to permit the main unit to be lifted by a forklift, scissor lift or elevator.

Figure 16:
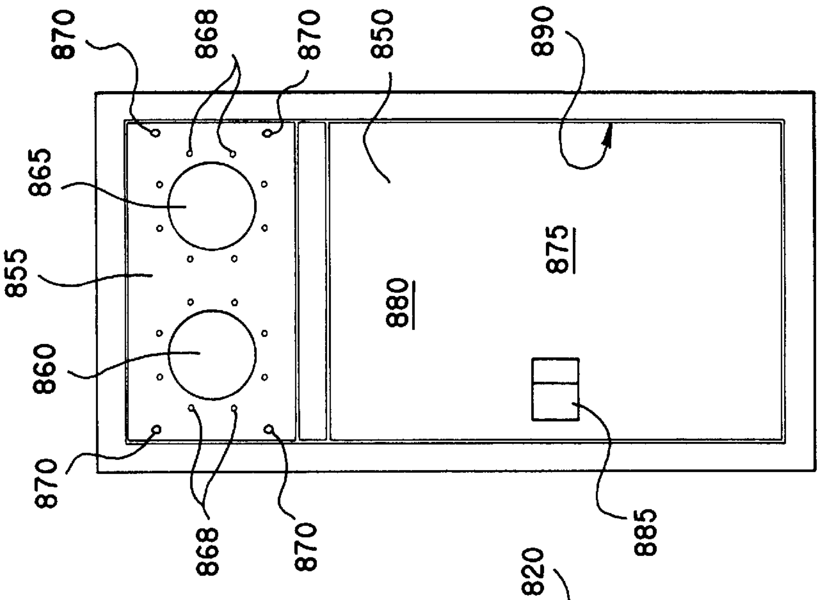
FIG. 16 is a top view of the main unit in a sixth configuration.

The top side wall 302 has a frame-like substructure which permits its configuration to be easily altered. FIG. 16 show the configuration present on the top side wall 302 in FIG. 2. In the stand-alone embodiment, all six configurations shown in FIGS. 11–16 may be used. To convert from one configuration to another requires simple tools and the correct model. By removing or exchanging the panels one may easily alter the configuration.

The interior of the main unit 300 includes a motor-blower, a filter system and an air passageway. It has a first aperture (first air intake port) 318 and a second aperture (second air intake port) 320 located thereon. A first articulated suction duct 322 includes a proximal end 324 and a distal end 326. A second articulated suction duct 332 includes a proximal end 334 and a distal end 336. The first articulated suction duct 322 proximal end 324 is affixed to the first aperture (first air intake port) 318 by the articulated duct mounting means. The second articulated suction duct 332 proximal end 334 is affixed to the second aperture (second air intake port) 320 by the articulated duct mounting means.

The articulated duct mounting means which secure the first articulated suction duct 322 and the second articulated suction duct 332 to the main unit 300 may be one of any conventional and well-known mounting, connection and securing means. The dual articulated duct receiving panel is located on the top side wall 302 of the main unit 300. This structure is generally identical to the dual articulated duct receiving panel shown in FIG. 11, FIG. 12, FIG. 14 and FIG. 16.

The motor-blower causes untreated air to enter the main unit 300 through the first articulated suction duct 322 and the second articulated suction duct 332, then through the first aperture 318 and the second aperture 320, then passes through the filter system where the untreated air is treated, and then exhausts the treated air through an exhaust port 314 located on the front side wall 308.

The first air intake port 318 and the second air intake port 320 are connected to the proximal end 324 of the first articulated suction duct 322 and the proximal end 334 of the second articulated suction duct 332 respectively. Means to mount the proximal end 324 of the first articulated suction duct 322 to the first air intake port 318 are provided. Means to mount the proximal end 334 of the second articulated suction duct 332 to the second air intake port 320 are also provided. The aforementioned mounting means provided here may be one of any conventional and well-known mounting, connection and securing means.

The exhaust port 338 includes mounting means 340 to secure a mask 342 and exhaust duct 344. The mask 318 completely covers the generally rectangular exhaust port 338 and is configured in a tapered fashion to mate to the exhaust duct 344 within specific airtight tolerances. This permits any toxic fumes etcetera which may not be able to be treated by the organic filter system to be transported to a remote location. The remote location may include means to further treat and dispose of the exhaust. Since it is taken to a location away from the workers, worker safety is enhanced.

Located on the right side of the front side wall is a front door 350 which is secured and opened by a latching handle 352. The front door 350 is surrounded by a gasket to maintain airtight integrity. Behind the front door 350 is a filter system and motor and will better be described in FIG. 7.

Located on the top side wall 302 is a downdraft door 360. The downdraft door 360 also has a gasket surrounding its perimeter to maintain airtight integrity. The downdraft door 360 is opened and secured by a latching handle 362. Located below the downdraft door 360 is a region which is in the air passageway prior to the exhaust port 338. This region has a heavy screen that may support a prefilter and a means to set up right and left panels to form an enclosure about the region to permit spraying of smaller objects directly on the enclosure with the motor-blower taking away any overspray, errant particles, fumes etcetera. This will be shown in greater detail in the description of FIG. 9 and FIG. 9A.

Figure 3:
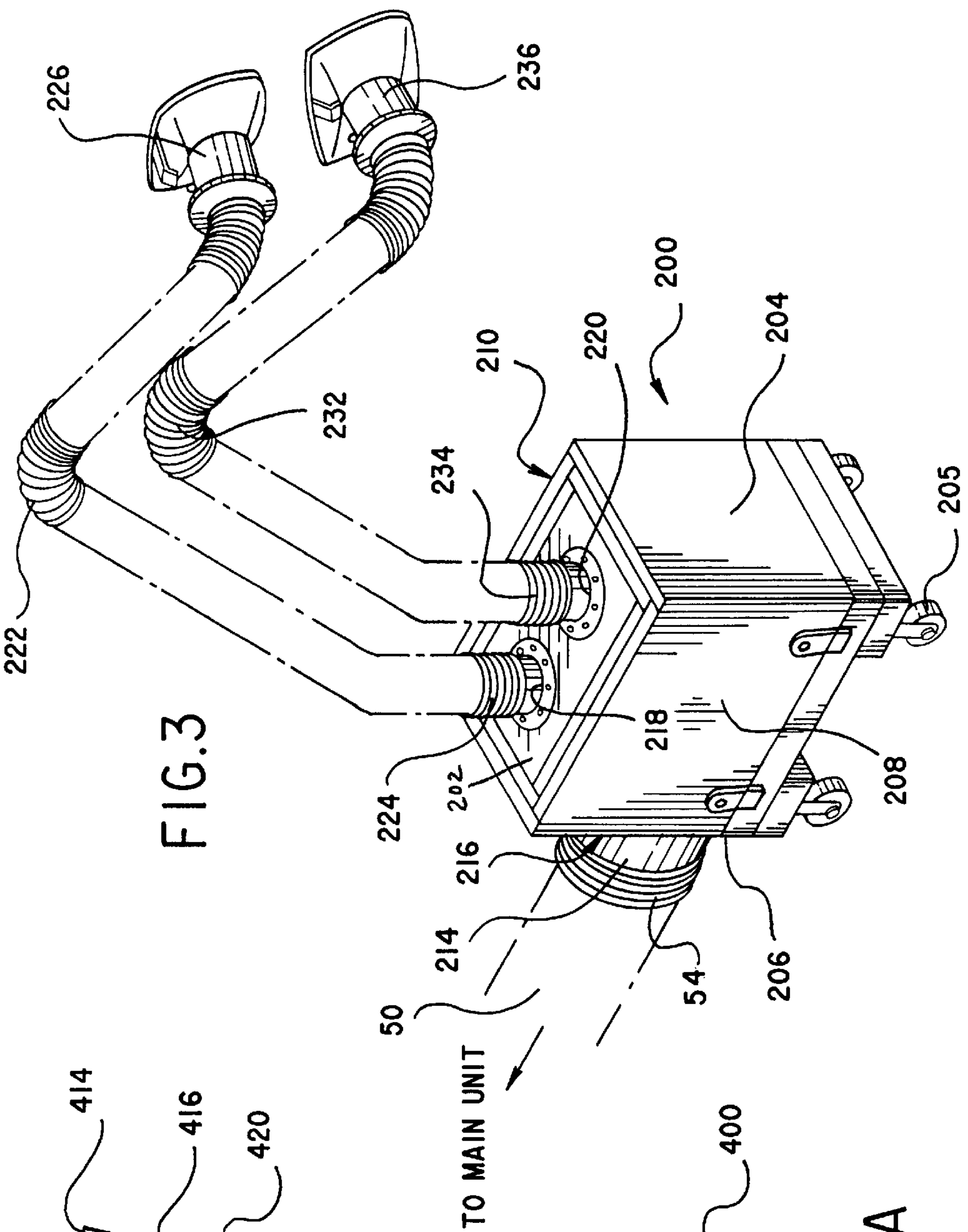
FIG. 3 is a view of the remote unit of the airborne pollution control system.
Figure 3A:
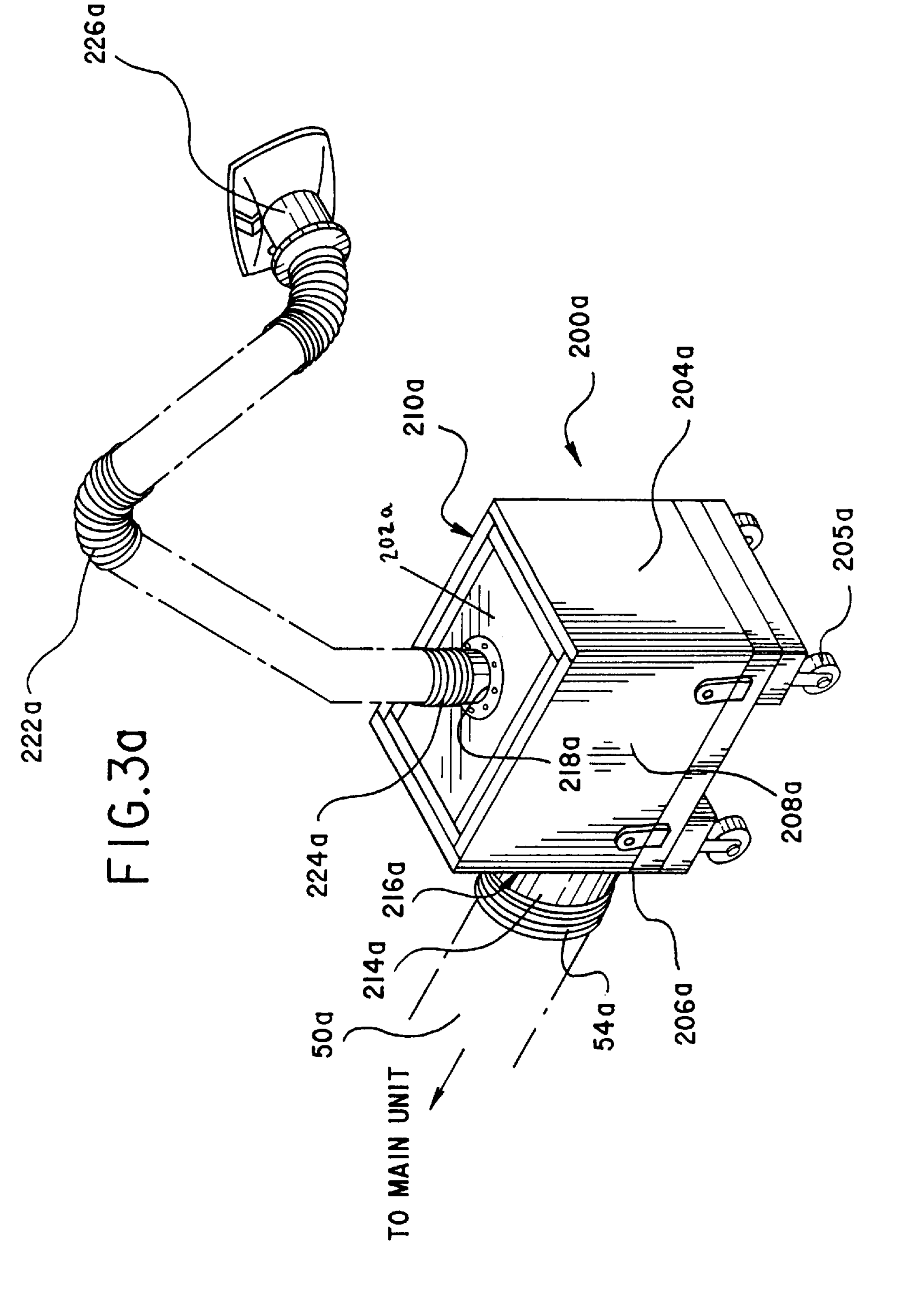
FIG. 3*a* is a view of another embodiment of the airborne pollution control system.

Referring now specifically to FIG. 3, a view of the remote unit 200 is shown. The remote unit 200 has been referred to as a remote plenum. Again, the remote unit 200 also has a cabinet-like structure, but it is significantly smaller in dimension than the main unit 100. The remote unit 200 may be wheeled 205, may be placed on a trolley or cart, or may just reside atop a surface. The remote unit 200 includes a top side wall 202, a right side wall 204, a left side wall 206, a front side wall 208, a rear side wall 210 and a bottom side wall 212. The interior of the remote unit is preferably hollow, although filtering units or a remote air motor may be present in certain applications. The left side wall 206 includes an aperture which acts as a remote unit air exhaust port 214. The remote unit air exhaust port 214 includes mounting means 216 to secure the second end 54 of the elongated duct 50 thereto.

As seen specifically in FIG. 3, a first embodiment of the remote unit 200 includes a top side wall 202 which has a first aperture (first air intake port) 218 and a second aperture (second air intake port) 220 located thereon. A first articulated suction duct 222 includes a proximal end 224 and a distal end 226. A second articulated suction duct 232 includes a proximal end 234 and a distal end 236. The first articulated suction duct 222 proximal end 224 is affixed to the first aperture (first air intake port) 218 by the articulated duct mounting means. The second articulated suction duct 232 proximal end 234 is affixed to the second aperture (second air intake port) 220 by the articulated duct mounting means (not shown). The articulated duct mounting means may be any conventional means to mount a duct to a surface.

The articulated duct mounting means which secure the first articulated suction duct 222 and the second articulated suction duct 232 to the remote unit 200 may be one of any conventional and well-known mounting, connection and securing means. The dual articulated duct receiving panel is the top side wall 202 of the remote unit 200. This structure is identical to the dual articulated duct receiving panel shown in FIG. 11, FIG. 12, FIG. 14 and FIG. 16. The dual articulated duct receiving panel is a common element and is dimensioned appropriately to permit it to be employed on the top side wall 102 of the main unit 100 as well as the top side wall 202 of the remote unit 200.

There is a certain comparison which should be made between elements of the remote unit 200 and elements of the stand alone main unit 300. First, the articulated suction ducts (222, 232, 322, & 334) are identical and interchangeable. Second, the mounting plate to which the articulated suction ducts are mounted are also identical and interchangeable. This gives one a sense of the difference in relative physical sizes of the main unit (100 & 300) compared to the remote unit 200.

Referring now specifically to FIG. **3*a*, a second embodiment of the remote unit 200*a* is shown. The remote unit 200*a* may be referred to as a remote plenum. Again, the remote unit 200*a* also has a cabinet-like structure, but it is significantly smaller in dimension than the main unit 100. The remote unit 200*a* also may include wheels 205*a*, may be placed on a trolley or cart, or may just reside atop a surface. The remote unit 200*a* includes the top side wall 202*a*, the right side wall 204*a*, the left side wall 206*a*, the front side wall 208*a*, the rear side wall 211*a* and the bottom side wall 212*a*. The interior of the remote unit is preferably hollow, although filtering units or a remote air motor may also be present in certain applications. The left side wall 206*a* includes an aperture which acts as a remote unit air exhaust port 214*a*. The remote unit air exhaust port 214*a* includes mounting means 216*a* to secure the second end 54*a* of the elongated duct 50*a*** thereto.

The remote unit **200*a* top side wall 202*a* has an aperture (air intake port) 218*a* located thereon. An articulated suction duct 222*a* includes a proximal end 224*a* and a distal end 226*a*. The articulated suction duct 222*a* proximal end 224*a* is affixed to the aperture (air intake port) 218*a*** by the articulated duct mounting means (not shown). The articulated duct mounting means may be any conventional or well known means to secure a duct to a surface.

The articulated duct mounting means which secures the articulated suction duct **222*a* to the remote unit 200*a*** may be one of any conventional and well-known mounting, connection and securing means.

There are other possible configurations for the remote unit. For instance, in one case, the top side wall may be comprised of a pivotally mounted door. When the door is opened, a screen support or the like may be located therein. The screen support is similar to the screen shown by element A in FIG. 9A. The downdraft table remote unit embodiment may have a similar appearance to the downdraft table which may be employed on the main unit. A small workpiece may be placed on the screen support and sprayed or coated and the overspray, errant particles, VOCs and the like would be caused to travel through the remote unit and into the elongated duct which is connected to the main unit. The vacuum imparts energy to move the particles to the treatment area of the main unit, and then the air would be subsequently exhausted in a safe manner.

Another possible configuration for the remote unit is where one of the sidewalls would be removed and a sieve, porous surface or pre-filter would be adapted to be received therein. In this embodiment the sieve, porous surface or pre-filter would be preferably located on the sidewall opposite the central duct mounting aperture to which the elongated duct is affixed. This configuration may be employed where a general evacuation of airborne contaminants of the types mentioned throughout this patent is desired.

These alternate embodiments would be employed in circumstances where their structural features permit greater usage options and increased efficiency. For instance, consider that a touch up job needed to be completed deep inside a US Naval Vessel. The touch up embodiment would be used and the worker would merely lay the part on the screen support and spray coat the item which required the touch up. This would be in a location which would be totally inaccessible to the main unit 100. The embodiment where the sidewall of the remote unit is turned into essentially a large air entrance area still in communication with the main unit and the vacuum caused by the same main unit may be employed to rapidly exhaust a room, again deep inside a Naval Vessel, or aircraft, or anywhere where it would be difficult for the main unit 100 to be placed.

Figure 4B:
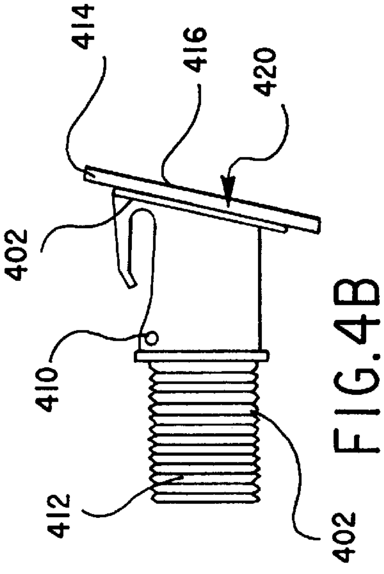
FIG. 4B is a view of the pre-filter and pre-filter support mounted to the end of one of the articulated suction ducts.
Figure 4A:
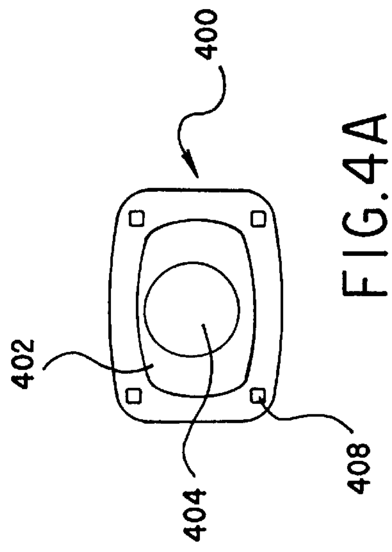
FIG. 4A is a view of the end of one of the articulated suction ducts, showing attachment means.

Referring now specifically to FIGS. 4A & 4B, several views of a generic articulated suction duct distal end 402 is shown. The end view 400 shows a hollow interior region 404 which is centrally located. This region 404 has a door which may be opened or shut by a manual damper 410 located on the articulated suction duct 412. This makes the articulated suction duct 412 able to be airtight or permit air to pass by the vacuum energy caused by the motor-blower. Velcro tabs 408 are located as shown thereon to attach a filter frame 414 which holds a filter 416 therein. This filter assembly 420 creates a larger surface area for particulates, errant particles, overspray, etcetera to be collected. Further, the filter 416 will cause many of the airborne particles to be collected at the ends of the articulated suction ducts which helps extend the lifetime of the filter system located inside the main unit (100 or 300). Some filters have material properties which permit them to be attached directly to the velcro tabs without the filter frame 414.

Figure 5:
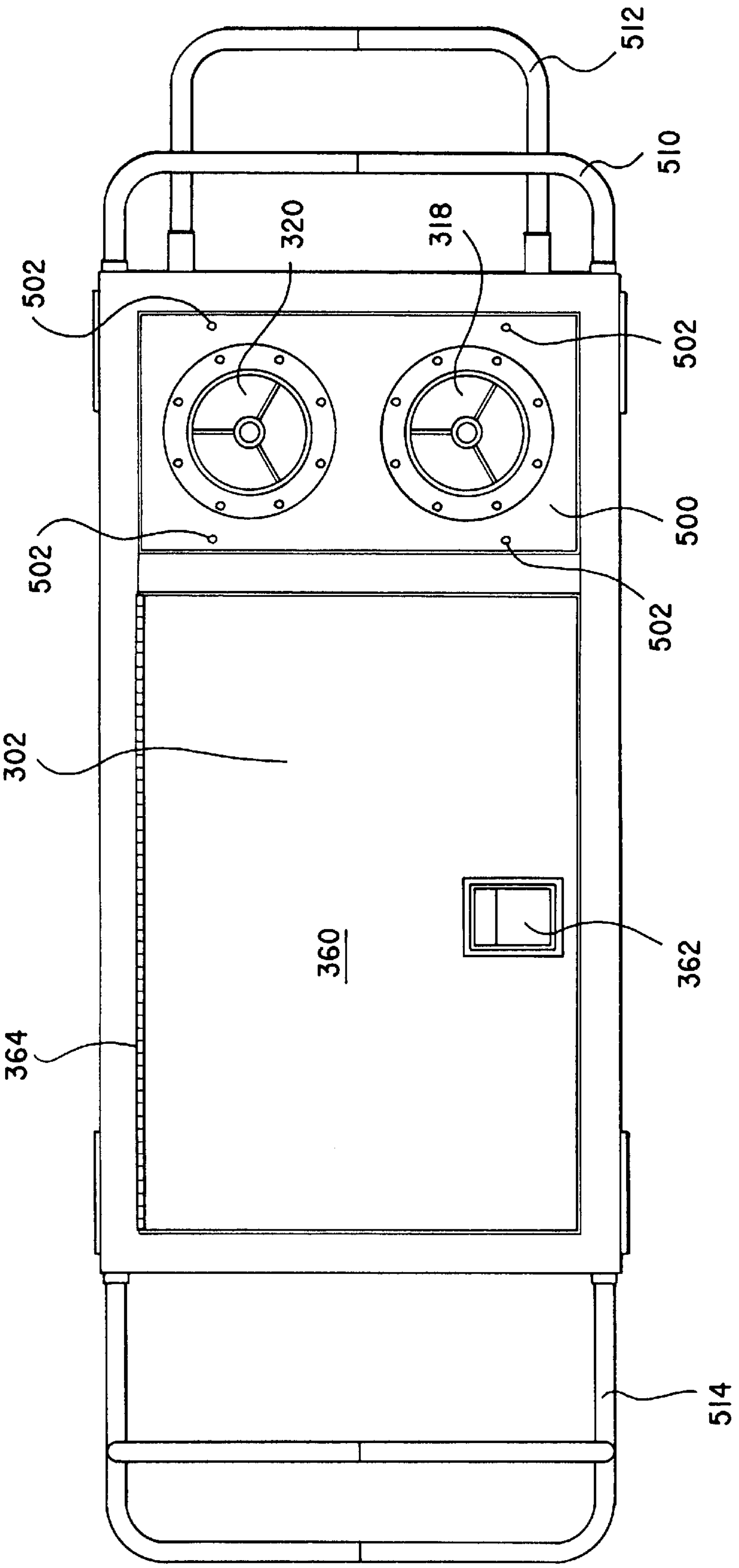
FIG. 5 is a top view of the main unit of the portable airborne pollution control system showing one of the six preferred configurations, as shown in FIG. 11 through FIG. 16.

FIG. 5 shows a top view of the main unit in the stand-alone configuration. The first air intake port 318 and the second air intake port 320 are located on the mounting plate 500. Mounting plate 500 is secured by fasteners 502 which secure mounting plate 500 to the main unit 300. Mounting plate 500 may be easily interchanged with a mounting plate having a single aperture which would convert this to the system configuration, i.e.: switching from the stand-alone configuration to one where the main elongated duct 50 connects the main unit 100 to the remote unit 200. A plurality of handles 510, 512, & 514 are provided for pushing the main unit, for guarding extended portions, such as the motor, against hitting a wall as well as storing power cables thereon. The downdraft door 360 and opening latch 362 are also shown. To open the downdraft door 360, latch 362 is pulled, and the downdraft door 360 is moved rearwardly about hinge 364 until it is in a completely upright position, perpendicular to the top side wall 302.

Figure 6:
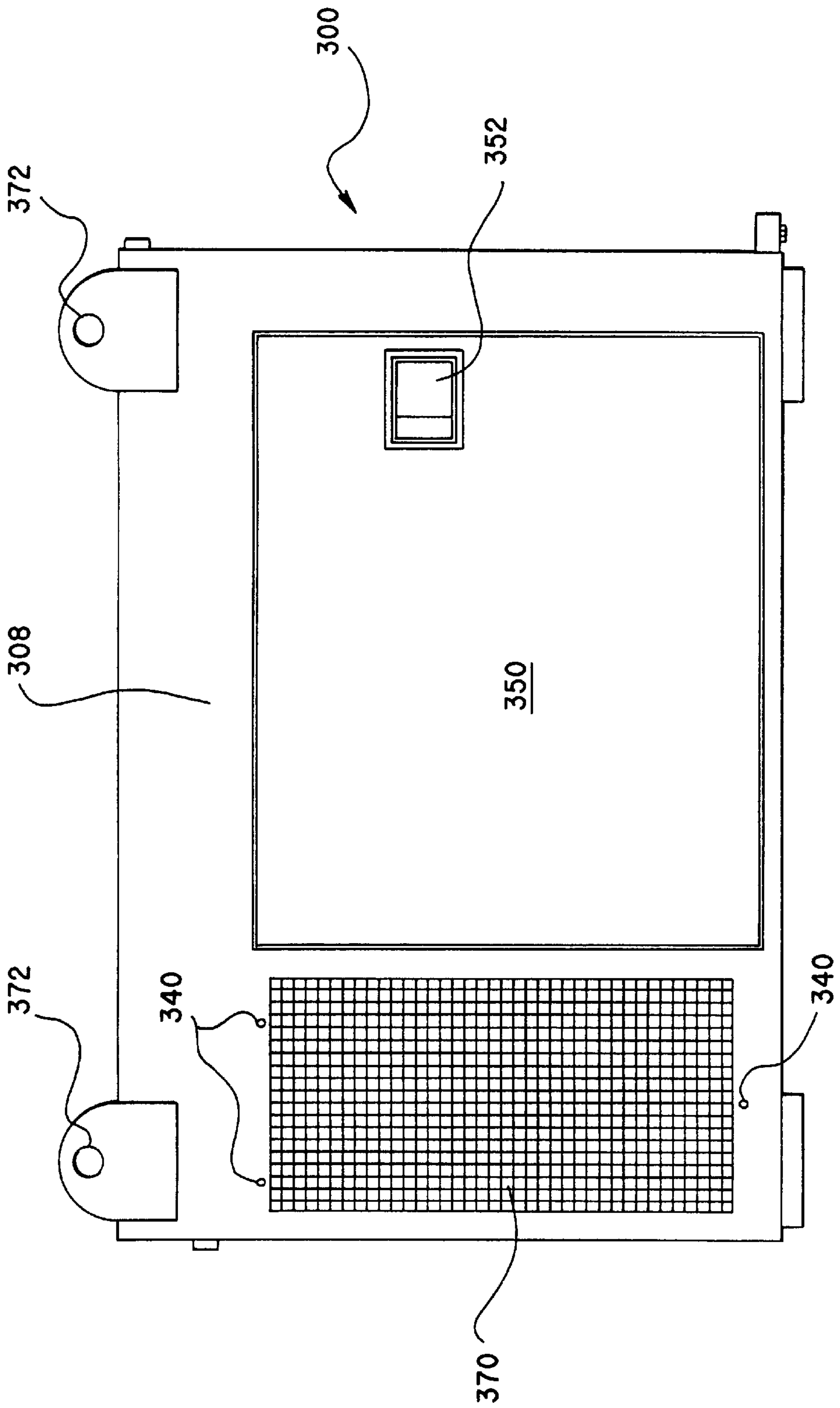
FIG. 6 is a front view of the main unit of the portable airborne pollution control system.

Referring now specifically to FIG. 6 the front side wall 308 of the main unit 300 is shown. The front door 350 is shown with the latching handle 352. Located about the interior perimeter of the front door 350 is a gasket which makes the front door 350 air tight. The exhaust grill 370 is shown sans mask 342 and exhaust duct 344. Mounting means 340 are provided generally about the perimeter of the exhaust grill to attach the mask 342 thereto, by affixing the mask 342 by fasteners. There are circumstances when the mask 342 and exhaust duct 344 are not required. Such circumstances include, but are not limited to, using the main unit 300 outdoors, using the portable airborne pollution control system 10 while collecting non-harmful errant particles, overspray and the like. Lifting eyes 372 are provided on the corners of the front side wall 308 as well as the rear side wall 310 (not shown). This permits the main unit (100, 300) to be lifted by a crane or other system which can mate with the lifting eyes and raise the main unit (100, 300).

Figure 7:
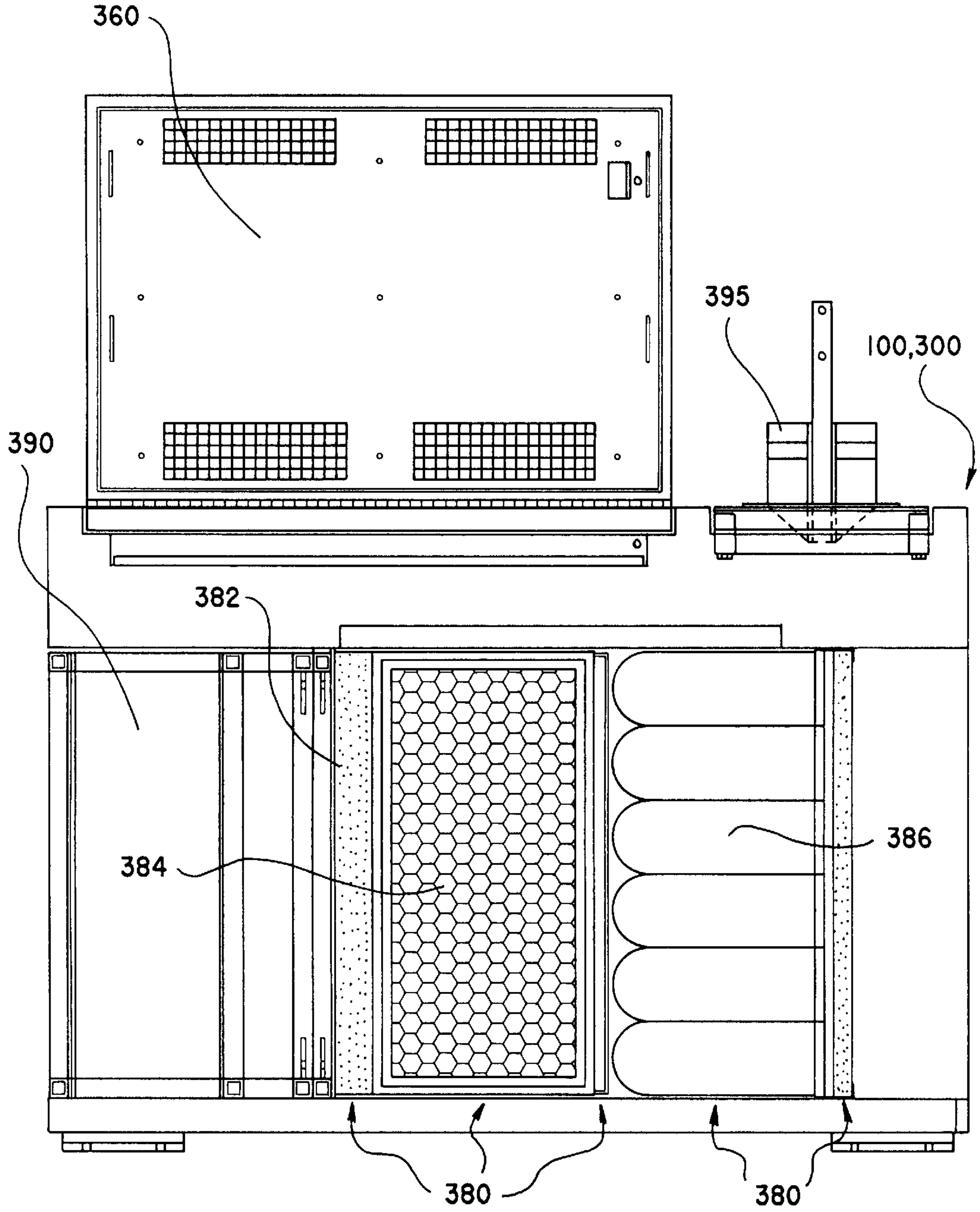
FIG. 7 is a cutaway front view of the main unit of the portable airborne pollution control system showing the replaceable filter configuration, motor cage, and top door in the open position.

Referring now to FIG. 7, a view of the main unit (100, 300) with the front side wall 308 being removed is shown.

The downdraft door 360 is open to its full extent. The filter system 380 is shown generally on the right side of FIG. 7. The filter system 380 includes a first filter (known as a pocket filter) 386, a HEPA filter 384 and a third filter (charcoal filter) 382. Mounting structure is included in the filter system 380 to permit the filters (382, 384, & 386) to be easily replaced once they have reached their lifetime.

A motor cage 390 is shown generally on the left side of FIG. 7. The motor cage 390 is slidable in order to facilitate the maintenance, repair and replacement of the motor-blower, motor-cone or other motor-related hardware. Element 395 in FIG. 7 is a mounting bracket which is used for mounting the articulated suction ducts.

Figure 8A:
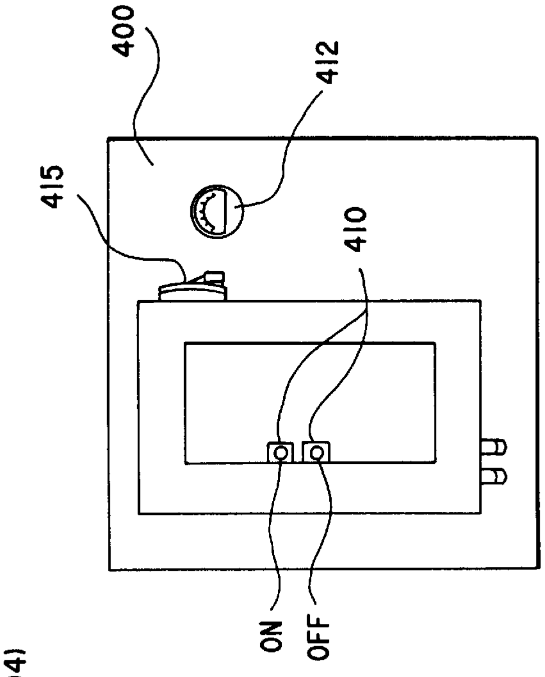
FIG. 8A is a view of the control panel which would be located atop the first side wall of the portable airborne pollution control system as shown in FIG. 8.
Figure 8:
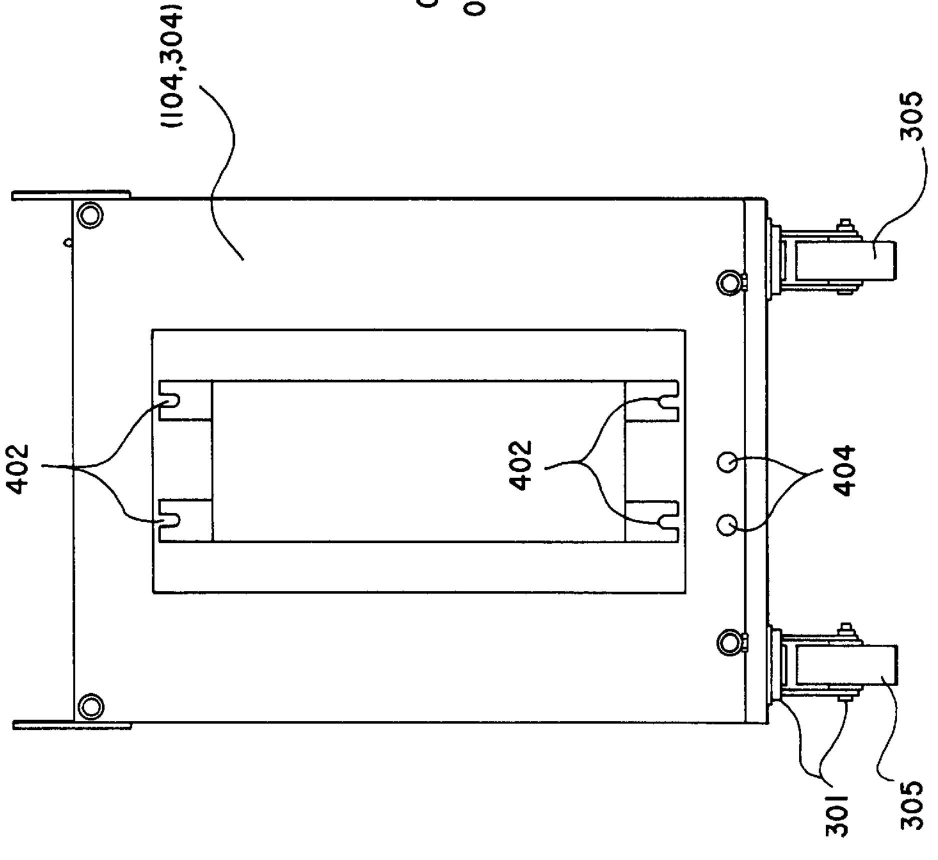
FIG. 8 is a first side view of the portable airborne pollution control system, showing substructure required to support the control panel.

Referring now specifically to FIG. 8 and FIG. 8A, the right side wall (104, 304) is shown. In FIG. 8 the right side wall 304 is shown prior to the mounting of the control panel 400. Wheels 305 are shown with their wheel mounting structure 301. Similar wheels 305 and wheel mounting structure 301 are located on the left side wall (106, 306). Control panel mounting elements 402 are shown. Apertures 404 permit control panel 400 electrical wires to pass through the bottom side wall (112, 312) to control the motor-blower, plus permit sensors such as pressure sensors to communicate between the sensor and the gauge shown on the control panel 400.

FIG. 8A shows the control panel 400. Indicator lights 410 are provided on the face of the control panel 400. A pressure gauge 412 is provided on the right side wall 304 as well. The pressure gauge 412 is connected to a pressure sensor located within the main unit 100. An on-off switch 415 is provided.

Figure 9:
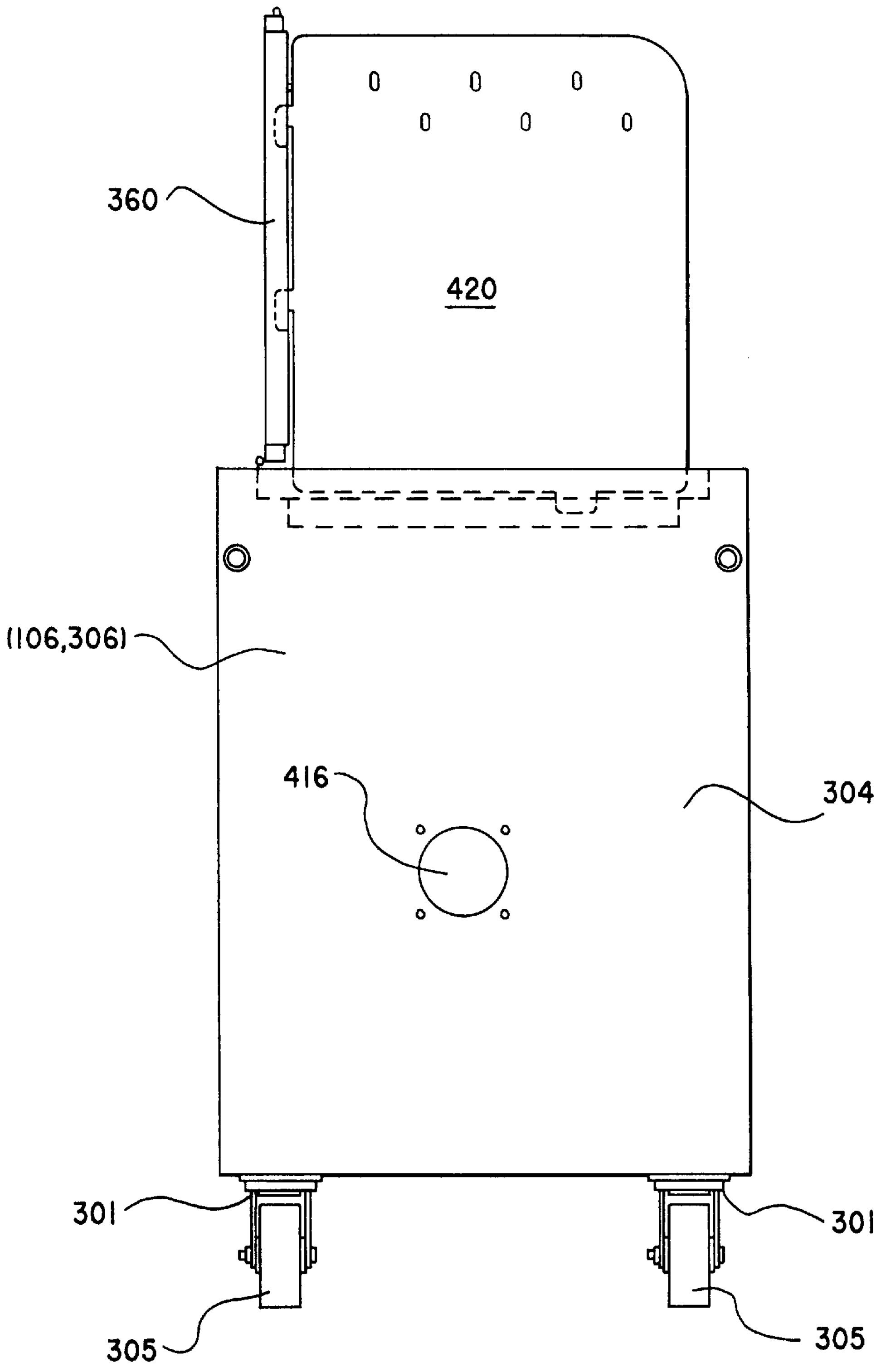
FIG. 9 is a second side view of the portable airborne pollution control system showing an aperture to receive a portion of the motor therethrough, and additionally, shows one wall of an enclosure which may be formed on the top of the main unit, when in one of the stand-alone configurations.
Figure 9A:
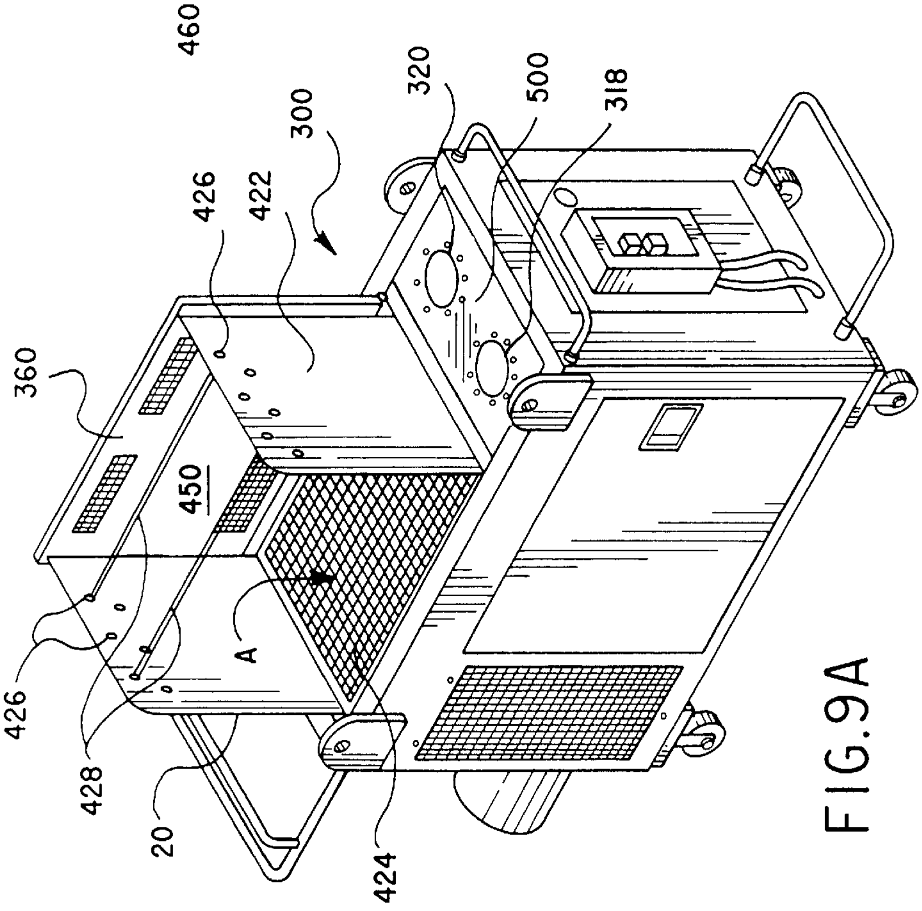
FIG. 9A shows a view of a spraying enclosure which is formed on the top of the main unit of the airborne pollution control device which permits touch-up and small jobs to be performed directly on the main unit.

Referring now specifically to FIG. 9, a view of the left side wall (106, 306) is shown. Wheels 305 are shown with their wheel mounting structure 301. The downdraft door 360 is shown in its open position, where it is mated with a left panel 420. A right panel is shown in FIG. 9A, which defines an enclosure and will be addressed in the discussion of FIG. 9A. A portion of the motor-blower extends through an aperture 416 present in the left side wall (106, 306).

Referring now specifically to FIG. 9A, a view of the main unit 300 with the spraying enclosure 450 is shown. The spraying enclosure 450 is defined by the three vertical panels, the downdraft door 360 (in vertical position), the left panel 420 and the right panel 422. To the right of the right panel 422 is mounting plate 500 to which the articulated ducts would be attached. In this configuration, the apertures (318, 320) would be secured. Alternatively, a mounting plate with no apertures may be secured in the place of the mounting plate 500.

An item to be sprayed or have touch-up work performed upon it would be placed on the screen 424 which defines the floor of the spraying enclosure 450. Arrow A defines the direction of the downdraft caused by the motor-blower, which would cause any overspray or errant particles generated to be suctioned through the filter system and then to the exhaust. Both the left panel 420 and the left panel 422 have a plurality of apertures 426 located thereon. The apertures 426 are located in such a fashion to suspend a rod 428 intermediate their location, thus permitting an article of work to be suspended from the aforesaid rod 428. The left panel 420 and the right panel 422 may be vertically mounted about the right and left perimeters of the screen 424 respectively.

Figure 10:
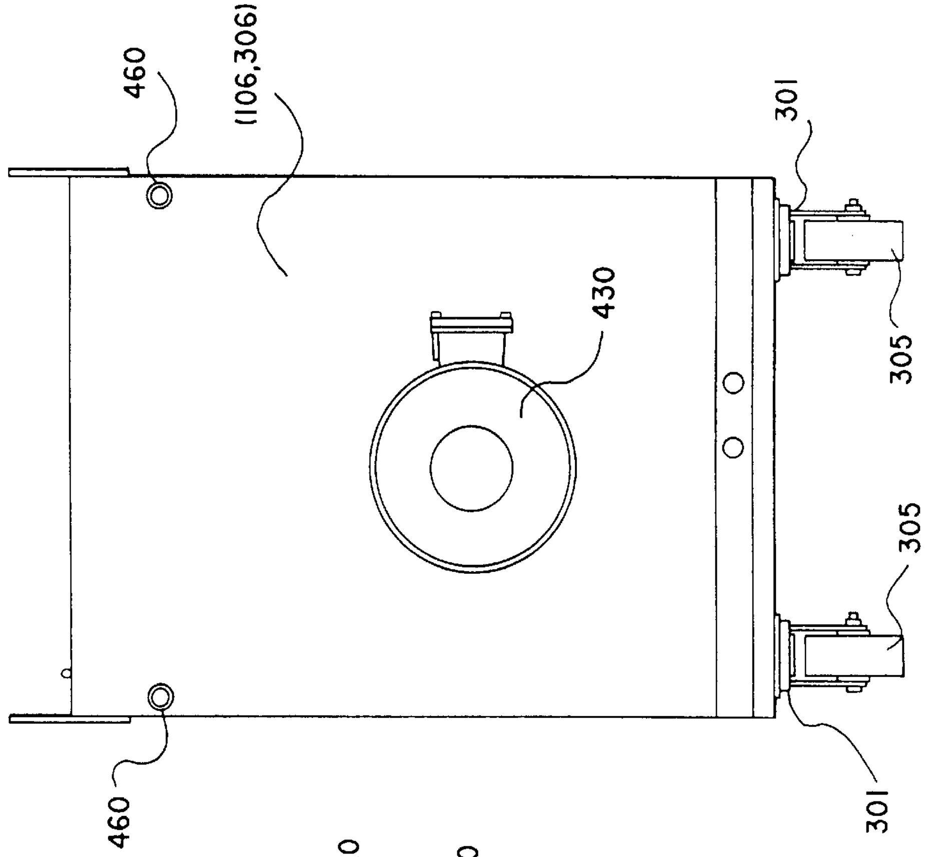
FIG. 10 is a second side view of the portable airborne pollution control system showing a portion of the motor therethrough.

Referring now specifically to FIG. 10, the left side wall (106, 306) is shown. Wheels 305 are shown with their wheel mounting structure 301. Similar wheels 305 and wheel mounting structure 301 are located on the right side wall (104, 304) as indicated in the discussion of FIG. 8. Element 460 is a handle 514 which protrudes horizontally from the left side wall (106, 306) and can best be seen in FIG. 5. The length of the handle 514 protects the motor-blower unit 430 which also protrudes horizontally from the left side wall (106, 306) but not to the same degree as the handle 514. If the main unit (100, 300) should roll and hit a wall or the like, the impact would be on the handle 514 and not on the exposed portion of the motor-blower unit 430.

FIGS. 11–16 diagram different configurations for the top side wall (102, 302) for the main unit. Some are better suited to be used with the portable airborne pollution control system 10 with the main unit 100, (this has the top side wall 102), whereas others are best suited to be used with the main unit 300 in the stand-alone configuration (having the top side wall 302).

Figure 11:
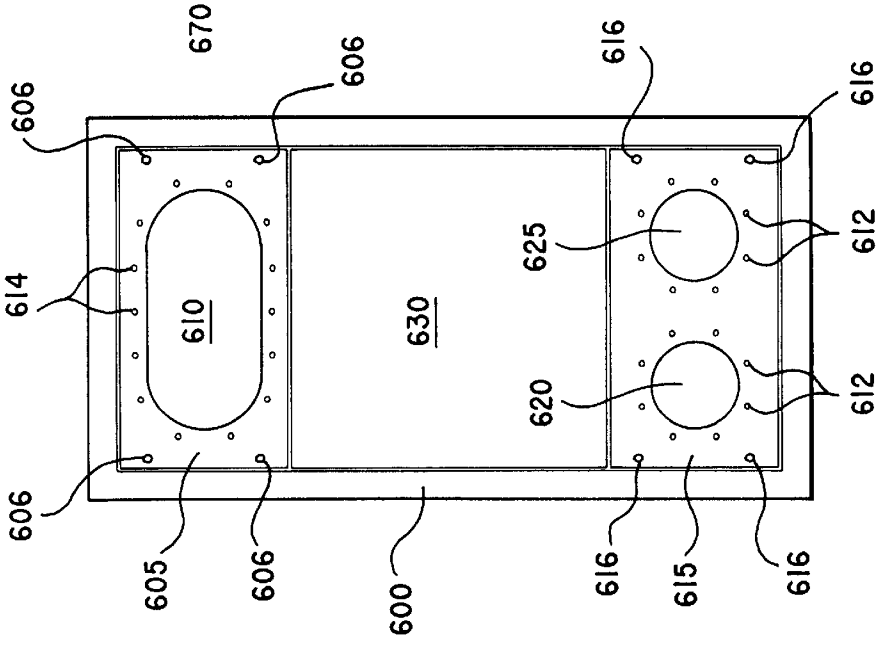
FIG. 11 is a top view of the main unit in a first configuration.

FIG. 11 shows a first top side wall configuration 600. Top side configuration 600 has a first side 605 with a central aperture 610, the central aperture 610 designed to be mated with a duct to be connected to the remote unit (not shown). Small fastener receiving apertures 614 will receive fasteners to secure the duct and any ancillary duct mating structure to the central aperture 610.

Top side configuration 600 has a second side 615 which has a first aperture 620 and a second aperture 625 designed to be mated with the first articulated suction duct and the second articulated suction duct (not shown). Small fastener receiving apertures 612 will receive fasteners to secure the articulated suction ducts and any ancillary duct mating structure to the first aperture 620 and the second aperture 625.

The central element 630 is a solid air-proof element, which in this configuration is secured to a framework located in the body of the main unit 100.

First side 605 is secured to the main unit 100 by a plurality of removable fasteners placed through plate apertures 606. The first side 605 is a plate like structure which mounts to a framework which exists in the area below where the first side 605 is mounted. The fasteners may be one of any type of conventional threaded fasteners.

Second side 615 is secured to the main unit by a plurality of removable fasteners placed through plate apertures 616. The second side 615 is also a platelike structure which mounts to a framework which exists in the area below where the second side 615 is mounted. The fasteners may be one of any type of conventional threaded fasteners.

Both first side 605 and second side 615 may be removed, interchanged or replaced with a plate having no large centrally disposed apertures with the exception of the small fastener receiving apertures. This would make either plate air-proof as well. This shows how versatile the top side wall of the unit can be.

Figure 12:
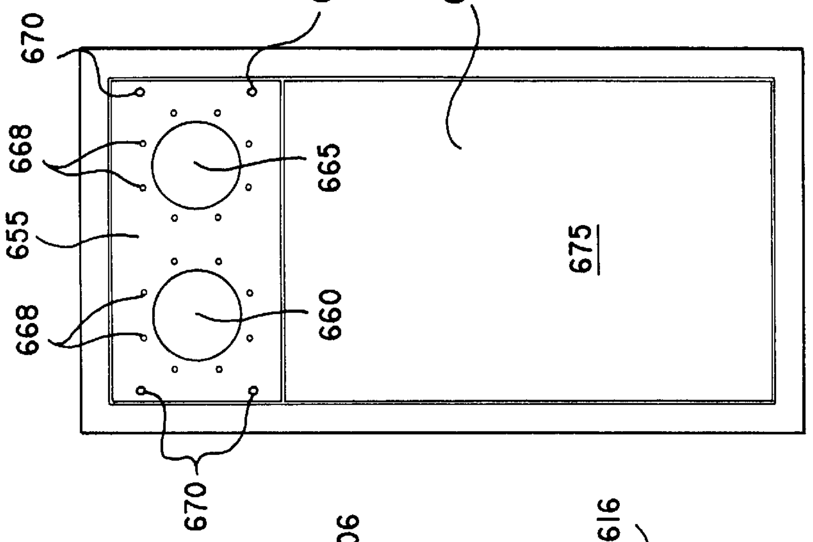
FIG. 12 is a top view of the main unit in a second configuration.

FIG. 12 shows a second top side wall configuration 650. Second top side configuration 650 has a first side 655 which has a first aperture 660 and a second aperture 665 designed to be mated with the first articulated suction duct and the second articulated suction duct (not shown). Small fastener receiving apertures 668 will receive fasteners to secure the articulated suction ducts and any ancillary duct mating structure to the first aperture 660 and the second aperture 665.

First side 655 is secured to the main unit 100 by a plurality of removable fasteners placed through plate apertures 670. The first side 655 is a plate-like structure which mounts to a framework which exists in the area below where the first side 655 is mounted. The fasteners may be selected to be any type of conventional threaded fasteners. The first side 655 may be replaced with a plate-like structure having the configuration shown in FIG. 11, of the first side 605 of the first top side wall configuration 600. This shows the versatility of the invention.

The second side 675 of the second top side wall configuration 650 is a table top. This table top may support objects and tools, is secured in place and is air proof.

FIG. 13 shows a third top side wall configuration 700. Third top side configuration 700 has a first side 705. First side,705 includes a generally centrally disposed aperture 710, the central aperture 710 designed to be mated with a duct to be connected to the remote unit (not shown). Small fastener receiving apertures 715 will receive fasteners to secure the duct and any ancillary duct mating structure to the first aperture 710.

First side 705 is secured to the main unit 100 by a plurality of removable fasteners placed through plate apertures 720. The first side 705 is a plate-like structure which mounts to a framework which exists in the area below where the first side 705 is mounted. The fasteners may be selected to be any type of conventional threaded fasteners. The first side 705 may be replaced with a plate like structure having the configuration shown in FIG. 12, of the first side 655 of the second top side wall configuration 650. This further shows the versatility of the invention.

The third top side wall configuration 700 includes a second side 725. The second side 725 is the downdraft door 730. A downdraft door handle 735 is provided. By actuating the downdraft door handle 735, the downdraft door 730 may be opened, pivoting about hinges located along the line 740. Once the downdraft door 730 is perpendicular to the third top side wall 700, it is secured in that vertical relation. This would begin to establish the downdraft area which is shown in FIGS. 9 and 9A.

Figure 14:
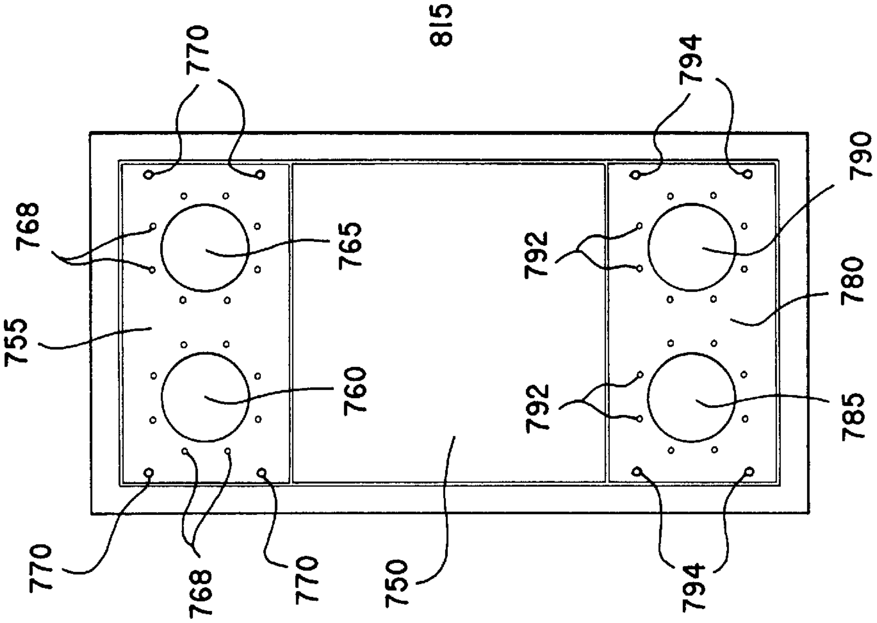
FIG. 14 is a top view of the main unit in a fourth configuration.

FIG. 14 shows a fourth top side wall configuration 750. The fourth top side wall configuration 750 has a first side 755 which has a first aperture 760 and a second aperture 765 designed to be mated with the first articulated suction duct and the second articulated suction duct (not shown). Small fastener receiving apertures 768 will receive fasteners to secure the articulated suction ducts and any ancillary duct mating structure to the first aperture 760 and the second aperture 765.

First side 755 is secured to the main unit 100 by a plurality of removable fasteners placed through plate apertures 770. The first side 755 is a plate-like structure which mounts to a framework which exists in the area below where the first side 755 is mounted. The fasteners may be selected to be any type of conventional threaded fasteners. The first side 755 may be replaced with a plate-like structure having the configuration shown in FIG. 11, of the first side 605 of the first top side wall configuration 600.

The fourth top side configuration 750 has a second side 780 which has a third aperture 785 and a fourth aperture 790 designed to be mated with a third articulated suction duct and a fourth articulated suction duct (not shown). Small fastener receiving apertures 792 will receive fasteners to secure the articulated suction ducts and any ancillary duct mating structure to the third aperture 785 and the fourth aperture 790.

Second side 780 is secured to the main unit 100 by a plurality of removable fasteners placed through plate apertures 794. The second side 780 is a plate-like structure which mounts to a framework which exists in the area below where the second side 780 is mounted. The fasteners may be one of any type of conventional threaded fasteners.

The first side 755 or second side 780 may be replaced with a plate-like structure having the single duct configuration shown in FIG. 11, of the first side 605 of the first top side wall configuration 600.

Intermediate the first side 755 and the second side 780 is a middle element 796. The middle element 796 is a flat portion which may act as a table top. This table top may support objects and tools, is secured in place and is air-proof.

Figure 15:
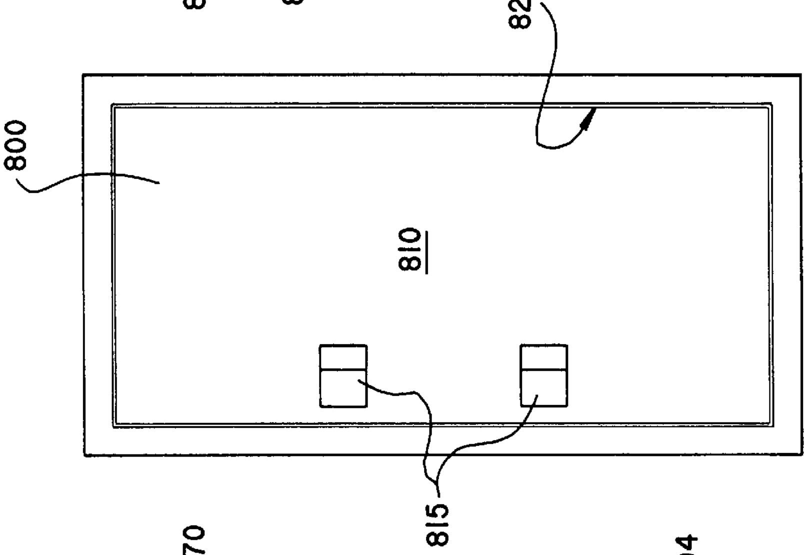
FIG. 15 is a top view of the main unit in a fifth configuration.

FIG. 15 shows a fifth top side wall configuration 800. In the fifth top side wall configuration 800, the main unit functions as a stand-alone unit. It includes a downdraft door 810 which covers the entire top portion of the main unit. A single or plurality of downdraft door handles 815 are provided. When the downdraft door handles 815 are actuated, the downdraft door 810 would be opened and rotated about hinge elements located on line 820. After the downdraft door 810 is opened and is placed in a perpendicular relation to the main unit, a right and left panel would be affixed, forming the spraying enclosure as shown in FIGS. 9 and 9A.

FIG. 16 shows a sixth top side wall configuration 850. Sixth top side configuration 850 has a first side 855 which has a first aperture 860 and a second aperture 865 designed to be mated with the first articulated suction duct and the second articulated suction duct (not shown). Small fastener receiving apertures 868 will receive fasteners to secure the articulated suction ducts and any ancillary duct mating structure to the first aperture 860 and the second aperture 865.

First side 855 is secured to the main unit 100 by a plurality of removable fasteners placed through plate apertures 870. The first side 855 is a plate-like structure which mounts to a framework which exists in the area below where the first side 855 is mounted. The fasteners may be selected to be one of any type of conventional threaded fasteners. The first side 855 may be replaced with a plate like structure having the configuration shown in FIG. 13, showing the ease in which the configuration of FIG. 13 may be replaced with the configuration of FIG. 16.

The sixth top side wall configuration 850 includes a second side 875. The second side 875 is the downdraft door 880. A downdraft door handle 885 is provided. By actuating the downdraft door handle 885, the downdraft door 880 may be opened, pivoting about hinges located along the line 890. Once the downdraft door 880 is perpendicular to the sixth top side wall 850, it is secured in that vertical relation. This would begin to establish the downdraft area which is shown in FIGS. 9 and 9A.

It is apparent from the above that the present invention accomplishes all of the objectives set forth by providing a portable airborne contamination control system with an independently employable main unit with the capability to be connected with any of a plurality of remote unit(s) wherein the main unit may be deployed in accessible areas and the remote unit(s) may be deployed in inaccessible areas. To summarize the remote unit(s) configuration, a) version one, with two independently movable articulatable suction ducts, b) version two, with one independently moveable articulatable suction duct, c) version three, a remote downdraft table for touch-up work, and d) version four, where the remote unit has a sidewall which is porous to air and large particles and may be used to exhaust an area.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

I claim:

1. A portable airborne contamination control system for collecting overspray, fumes, VOC, and errant particles generated whist treating, coating or blasting a workpiece, said system comprising:

a main unit, said main unit having a motor, an inlet port, and an exhaust port, said main unit adapted to create a vacuum thus creating an upstream and downstream flow between said inlet port and said exhaust port, an elongated duct, said elongated duct having a first downstream side and a second upstream side, a remote plenum unit, said remote plenum unit having a downstream exit port and an upstream entrance port, said elongated duct first downstream side being connected to said main unit inlet port, and said elongated duct second upstream side being connected to said remote plenum unit downstream exit port, said remote plenum unit upstream entrance port is in communication with said vacuum and is further adapted to being placed close to a workpiece being treated, whereby said remote plenum unit is placed in an area which is inaccessible to said main unit, said remote plenum unit placed proximal a workpiece being treated in such a manner where overspray and errant particles are generated, the overspray and errant particles being drawn through said remote plenum unit, further passing downstream through said elongated duct from said second upstream side to said first downstream side, further passing into said main unit inlet port and then exhausted through said main unit exhaust port.

2. A portable airborne contamination system control system as claimed in claim 1 wherein said remote plenum unit upstream entrance port is adapted to receive a single articulatable suction duct thereon.

3. A portable airborne contamination control system as claimed in claim 1 wherein said remote plenum unit upstream entrance port is adapted to receive a pair of individually articulatable suction ducts thereon.

4. A portable airborne contamination control system as claimed in claim 1 wherein said remote plenum unit upstream entrance port includes a screen, said screen adapted to receive items to be sprayed thereon, wherein any overspray or excess spray will be removed downstream by said vacuum.

5. A portable airborne contamination control system as claimed in claim 1, wherein said remote plenum unit has a top side, rear side, left side, and bottom side, and wherein said remote plenum unit downstream exit port is located on said remote plenum unit rear side, and said remote plenum unit upstream entrance port is located on said emote plenum unit front side, said upstream entrance port substantially forming said remote plenum unit front side, said upstream entrance port further adapted to retain a sieve therein, permitting large evacuation of contaminated air downstream from an area inaccessible to said main unit.

6. A portable airborne contamination control system comprising:

a main unit, said main unit having a motor, an upstream inlet port, and a downstream exhaust port, an elongated duct, said elongated duct having a first downstream side and a second upstream side, a remote plenum unit, said remote plenum unit having a downstream exit port and an upstream entrance port, and an articulated suction duct attached to said upstream entrance port, said elongated duct first downstream side connected to said main unit upstream inlet port, said elongated duct second upstream side connected to said remote plenum unit downstream exit port, and whereby said remote plenum unit is adapted to be placed in an area which is inaccessible to said main unit, and where said articulated suction duct is placed proximal to a workpiece being treated in such a manner where when overspray and errant particles are generated, the overspray and errant particles are suctioned downstream through said articulated suction duct are further suctioned downstream through said remote plenum unit, and further suctioned downstream through said elongated duct where they are suctioned into said main unit.

7. A portable airborne contamination control system as claimed in claim 6 wherein said articulated suction duct has a proximal downstream side and an upstream distal side, said articulated suction duct proximal downstream side is attached to said remote plenum unit upstream entrance port.

8. A portable airborne contamination control system as claimed in claim 7 wherein said articulated suction duct upstream distal side includes a mounting means adapted for mounting a filter thereto, whereby said filter acts a pre-filter, collecting the overspray and the errant particles thereon.

9. A portable airborne contamination control system as claimed in claim 6 wherein a filter system is located intermediate said main unit upstream inlet port and said main unit downstream outlet port.

10. A portable airborne contamination control system as claimed in claim 6 wherein said main unit downstream exhaust port is adapted to include an exhaust duct mounting means, said exhaust duct mounting means having an elongated exhaust duct mounted thereon.

11. A portable airborne contamination control system as claimed in claim 10 wherein said elongated exhaust duct has a proximal upstream end and a downstream distal end, said downstream distal end being placed at an appropriate location away from said main unit permitting the suctioned air, overspray, and errant particles to be conveyed away from main unit.

12. A portable airborne contamination control system as claimed in claim 6 wherein said remote plenum unit and said main unit are both adapted to be rolled on wheels.

* * * * *